(12) United States Patent
DeRobertis et al.

(10) Patent No.: US 7,885,412 B2
(45) Date of Patent: Feb. 8, 2011

(54) PRE-GENERATION OF GENERIC SESSION KEYS FOR USE IN COMMUNICATING WITHIN COMMUNICATIONS ENVIRONMENTS

(75) Inventors: Christopher V. DeRobertis, Hopewell Junction, NY (US); Robert R. Gensler, Jr., Hyde Park, NY (US); Serban C. Maerean, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 11/239,252

(22) Filed: Sep. 29, 2005

(65) Prior Publication Data

US 2007/0076889 A1    Apr. 5, 2007

(51) Int. Cl.
H04L 9/08 (2006.01)
H04L 9/14 (2006.01)
H04L 9/30 (2006.01)

(52) U.S. Cl. .................. 380/279; 713/170; 713/171; 713/173; 726/3; 726/4; 726/5

(58) Field of Classification Search ................ 380/259, 380/260, 261, 264, 267, 269, 273, 278, 279, 380/281, 283, 285, 45, 47; 713/151, 152, 713/159, 161, 166, 169, 170, 171, 177; 709/203, 709/206, 207, 226, 231, 244; 705/56, 67, 705/71, 75, 76, 78
See application file for complete search history.

(56) References Cited

U.S. PATENT DOCUMENTS

| | | | | |
|---|---|---|---|---|
| 4,578,530 A | * | 3/1986 | Zeidler ......................... | 705/71 |
| 5,265,164 A | * | 11/1993 | Matyas et al. ................. | 380/30 |
| 5,557,678 A | | 9/1996 | Ganesan ....................... | 380/21 |
| 5,602,917 A | | 2/1997 | Mueller ....................... | 380/21 |
| 5,799,086 A | * | 8/1998 | Sudia ........................... | 705/76 |

(Continued)

FOREIGN PATENT DOCUMENTS

GB    2365 702 A    2/2002

(Continued)

OTHER PUBLICATIONS

PCT Notification of Transmittal of the International Search Report and the Written Opinion of the International Searching Authority, or the Declaration, PCT/EP2006/065996, Dec. 27, 2006.

(Continued)

*Primary Examiner*—Taghi T Arani
*Assistant Examiner*—Kenneth Chang
(74) *Attorney, Agent, or Firm*—Matthew W. Baca; Jack V. Musgrove

(57) ABSTRACT

Generic session keys are pre-generated and stored in a pool of session keys for later use in communicating within a communications environment. The session keys that are stored in the pool are pre-encrypted with the private key of the entity storing those keys. To communicate between entities, a pre-encrypted session key is extracted from the pool and then further encrypted with the destination entity's public key to ensure data integrity and data confidentiality. The encrypted key is then forwarded to the destination entity and used during communications between the two entities.

17 Claims, 8 Drawing Sheets

U.S. PATENT DOCUMENTS

| | | | |
|---|---|---|---|
| 5,838,792 | A | 11/1998 | Ganesan ........................ 380/21 |
| 6,088,799 | A * | 7/2000 | Morgan et al. ............... 713/182 |
| 6,125,185 | A * | 9/2000 | Boesch ........................ 380/285 |
| 6,393,127 | B2 | 5/2002 | Vogler .......................... 380/283 |
| 7,191,335 | B1 * | 3/2007 | Maillard ...................... 713/176 |
| 2001/0019614 | A1 * | 9/2001 | Madoukh ..................... 380/277 |
| 2003/0225888 | A1 * | 12/2003 | Wason ......................... 709/227 |
| 2004/0054891 | A1 | 3/2004 | Hengeveld et al. .......... 713/163 |
| 2004/0236953 | A1 * | 11/2004 | Merenne et al. ............. 713/182 |
| 2005/0091171 | A1 * | 4/2005 | Grobman ...................... 705/64 |
| 2005/0190912 | A1 * | 9/2005 | Hopkins et al. ............... 380/44 |

FOREIGN PATENT DOCUMENTS

RU        2183348  C2    6/2002

OTHER PUBLICATIONS

"Provably Secure Session Key Distribution—The Three Party Case," Mihir Bellare, Phillip Rogaway, pp. 57-66, STOC'95.

"YouServ: A Web-Hosting and Content Sharing Tool for the Masses,", Roberto J. Bayardo, Jr., Rakesh Agrawal, Daniel Gruhl, Amit Somani, pp. 345-354, WWW 2002.

"Receiver Anonymity via Incomparable Public Keys," Brent R. Waters, Edward W. Felten, Amit Sahai, pp. 112-121, CCS'03.

"Developing a Heterogeneous Intrusion Tolerant CORBA System," David Sames, Brian Matt, Brian Niebuhr, Gregg Tally, Brent Whitmore, David Bakken, Proceedings of the International Conference on Dependable Systems and Networks (DSN'02).

"Data Encryption Standard (DES)," U.S. Department of Commerce/National Institute of Standards and Technology, FIPS PUB 46-3, Oct. 25, 1999, pp. 1-22.

"Advanced Encryption Standard (AES)," Federal Information Processing Standards Publication 197, Nov. 26, 1001, pp. 1-47.

"Secure Web Server Performance Dramatically Improved by Caching SSL Session Keys," Arthur Goldberg, Robert Buff, Andrew Schmitt; http://www.cs.nyu.edu/artg/research/ssl/ssl.html; 8 pages, Jun. 23, 1998.

* cited by examiner

US 7,885,412 B2

PRE-GENERATION OF GENERIC SESSION KEYS FOR USE IN COMMUNICATING WITHIN COMMUNICATIONS ENVIRONMENTS

TECHNICAL FIELD

This invention relates, in general, to providing secure communications in communications environments, and in particular, to pre-generating generic session keys for use in providing secure communications in such environments.

BACKGROUND OF THE INVENTION

Session keys are used to provide data integrity and data confidentiality in communications between two entities of a communications environment. A session key is valid only during the time that the connection between the entities is active. When the connection ends, so does the session and the validity of the session key.

There are various types of session keys and different techniques for generating the keys. One type of session key is a symmetric session key in which both entities communicating, such as a server and a client in a clustered environment, use the same key. In one example, this type of key is generated by having the server generate a symmetric key and then distribute it to the client. The distribution of the symmetric session key is secured by signing the session key with the server's private key and encrypting it with the client's public key to provide both data integrity and data confidentiality.

Signing with a private key involves encrypting a message digest with a private key, which is a slow operation. This is particularly troublesome in recovery situations. For instance, assume the management server of a management domain cluster goes down and then recovers. The management server must establish pre-existing communications channels with each of the clients in the cluster. Thus, the server must generate and distribute a new session key for each client in the management domain cluster. In a large cluster, such as, for example, those having more than 1,024 nodes, this operation is very expensive in terms of performance. This cost in performance hinders recoverability and availability. It also negatively affects scaling.

Based on the foregoing, a need exists for an enhanced technique for providing session keys usable in providing secure communications between parties of a communications environment.

SUMMARY OF THE INVENTION

The shortcomings of the prior art are overcome and additional advantages are provided through the provision of a method of providing session keys for use in communicating within communications environment. The method includes, for instance, encrypting a plurality of session keys to provide a plurality of pre-encrypted session keys for use in communicating between a first entity of the communications environment and one or more second entities of the communications environment, the plurality of pre-encrypted session keys being generic session keys that are created independently of and with no input from the one or more second entities; and maintaining the plurality of pre-encrypted session keys in a pool of session keys available for use, in response to a request for a session key.

In a further embodiment, a method of providing session keys for use in communicating within a communications environments is provided. The method includes, for instance, arbitrarily selecting a session key doublet from a pool of session key doublets for use in communicating between a first entity of the communications environment and a second entity of the communications environment, the pool of session key doublets providing a plurality of session key doublets, wherein a session key doublet includes a session key pre-encrypted with a private key of the first entity but generic to the second entity, and the same session key in an unencrypted form; extracting from the arbitrarily selected session key doublet the pre-encrypted session key; encrypting the pre-encrypted session key with a public key of the second entity to provide a further encrypted session key; and transmitting the further encrypted session key to the second entity for use in communications with the first entity.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, session keys are pre-generated and maintained in a pool of session keys. The session keys of this pool are generic in that the keys are not tied to specific destination entities (e.g., destination nodes) of a communications environment. For example, any session key of the pool can be selected by one entity and distributed to a chosen destination entity such that the entities can communicate. To provide secure communications between the two entities, the session key once taken from the pool is then encrypted with the public key of the destination entity. However, at the time the key is in the pool it is not specific to the destination entity. This provides flexibility and ease in creating, selecting and distributing session keys for use in communications within a communications environment.

Figure 1:
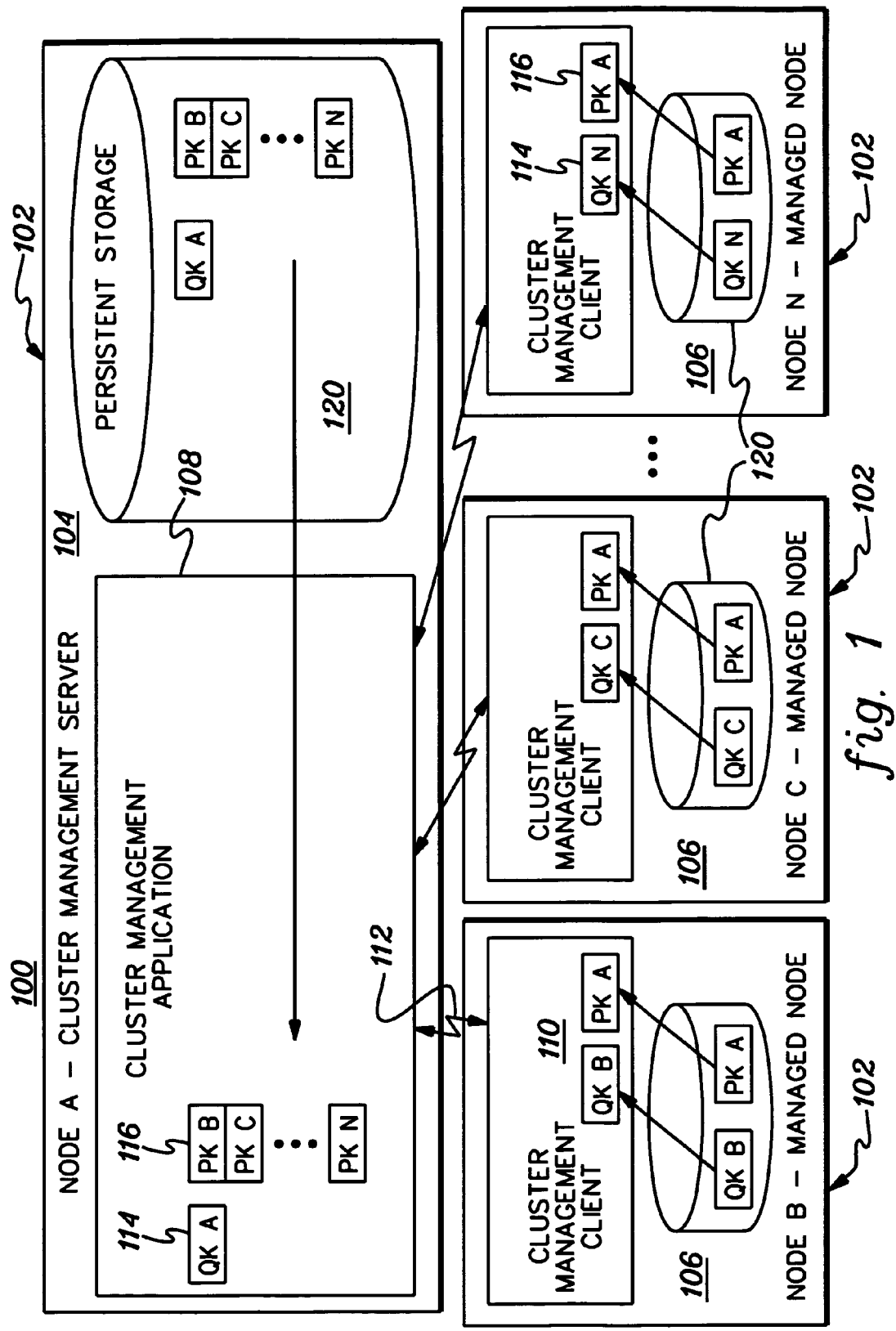
FIG. 1 depicts one embodiment of a communications environment incorporating and using one or more aspects of the present invention.

One embodiment of a communications environment incorporating and using one or more aspects of the present invention is depicted in FIG. 1. As one example, a communications environment 100 includes a clustered environment having a plurality of nodes 102. As an example, the nodes are RS/6000s or other types of computing systems. In this particular example, cluster 100 includes at least one cluster management server 104 and one or more cluster managed nodes 106. Cluster management server 104 executes a cluster management application 108 that is responsible for monitoring and controlling various aspects of cluster managed nodes 106. Cluster managed nodes 106 execute client applications 110 that interact with cluster management application 108 on the cluster management server node 104. Each client receives instructions from the cluster management application and acts upon them to fulfill the request made by the cluster management server node.

Cluster management application 108 and cluster management clients 106 communicate using a network protocol 112. The communications between each pair of communicators (e.g., a server and a client) is secure. To provide this security, session keys are used. Session keys are only valid during active sessions, which prevents the replaying of previously captured data streams. In this particular example, the session keys are symmetrical, and thus, both communicators use the same key to communicate.

For security purposes, the server securely distributes the symmetric session key to the client by signing the session key with the server's private key ("qk") 114 and encrypting it with the client's public key ("pk") 116.

Each node exchanges public keys with any node that may interact with it, such that the signing or encryption of data is possible. The keys of a particular node may be stored in persistent storage 120 of that node between executions of the cluster management applications and clients. Also, stored within persistent storage is cluster configuration information.

Each pair of communicators (e.g., server and client) employs a unique session key. Thus, for a large cluster, performance is improved by having numerous session keys available on demand. In accordance with an aspect of the present invention, a large number of session keys is generated in advance of their need, stored and cached for future use, such as whenever the cluster management application attempts to control any new cluster managed node or whenever a network connection between the cluster management application and the cluster management client is temporarily suspended or disconnected. Further, in one embodiment, session keys are replenished, as keys are extracted from the cache to provide a sufficient supply of session keys. Additional details regarding the use of session keys are described with reference to FIG. 2.

Figure 2:
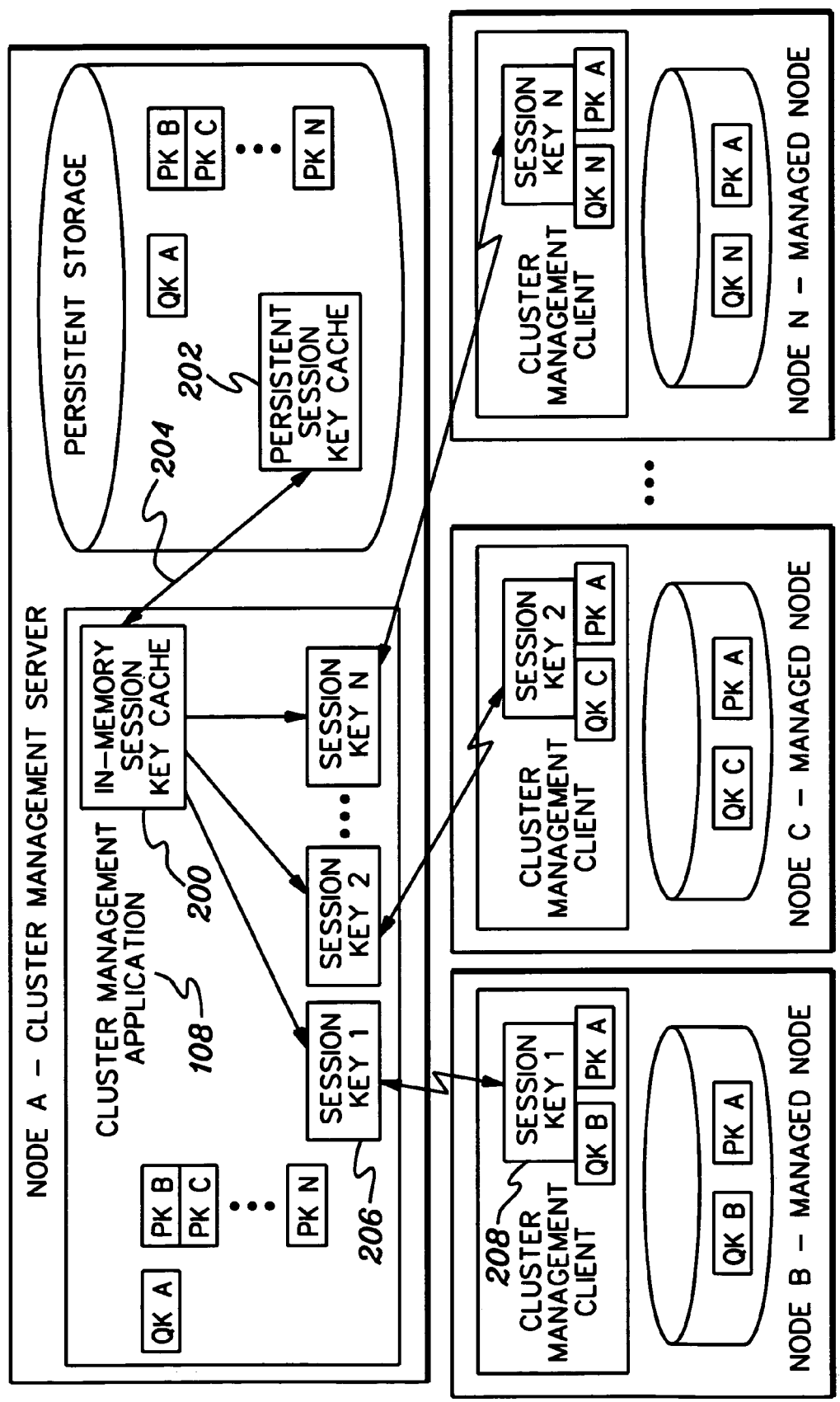
FIG. 2 depicts further details of the communications environment of FIG. 1, in accordance with an aspect of the present invention.

As depicted in FIG. 2, cluster management application 108 includes a session cache 200 that has unique session keys generated using a technique of the application's choice. Examples of such techniques include DES (Data Encryption Standard), which is described in Federal Information Processing Standards Publication 46-3 (Oct. 25, 1999), available at http://csrc.nist.gov/publications/fips/fips46-3/fips46-3.pdf and by ordering a copy from National Technical Information Service (NTIS), 5285 Port Royal Road, Springfield, Va. 22161; and AES (Advanced Encryption Standard), which is described in a Federal Information Processing Standards Publication 197 (Nov. 26, 2001), available at http://csrc.nist.gov/publications/fips/fips197/fips-197.pdf. and by ordering a copy from National Technical Information Service (NTIS), 5285 Port Royal Road, Springfield, Va. 22161, each of which is hereby incorporated herein by reference in its entirety. The session key cache includes, for instance, a plurality of symmetric session keys, and is generated in advance of execution of the cluster management application. It is retained in persistent storage 202, and is then loaded by the cluster management application during its initialization phase of execution 204.

In response to the cluster management application attempting to connect to a cluster management client on a managed node, the cluster management application extracts a new session key 206 from session key cache 200 and associates that session key with the network connection established with the cluster management client on the managed node. The network connection established with the cluster management client on the managed node represents the communication session that is to be protected by the session key. The session key is associated with the communication session it protects, such that when there is data transferred through the communication channel, the correct session key is used to validate the data.

The cluster management application protects the session key by encrypting it with the public key associated with the specific managed node, and transmits the session key through the network connection to the cluster management client on the managed node. The cluster management client extracts the session key 208 from the network transmission. This extraction includes, for instance, deciphering the session key using the client's private key. There are various public/private key cryptography techniques based on various standards. One such standard is the RSA cryptography standard, which is available in a package referred to as Open SSL (www.openssl.org). To use this function, the source code is obtained on-line, as one example, and compiled into, for instance, a static or shared library. Further details regarding RSA are described at ftp://ftp.rsasecurity.com/pub/pkcs/pkcs-1/pkcs-1v2-1.pdf, the contents of which are hereby incorporated herein by reference in their entirety.

After the initial transfer of the session key, the key is used to sign or encrypt data between the cluster management application and the cluster management client for as long as the network connection is considered active. The symmetric key provides improved encryption and signing performance over the private/public key technique.

The cluster management application may periodically synchronize the in-memory copy of the session key cache to persistent storage and may also store the unused keys within the session key cache to persistent storage when the application terminates. This permits the application to make use of any unused session keys during later executions without needlessly generating new session keys.

Figure 3:
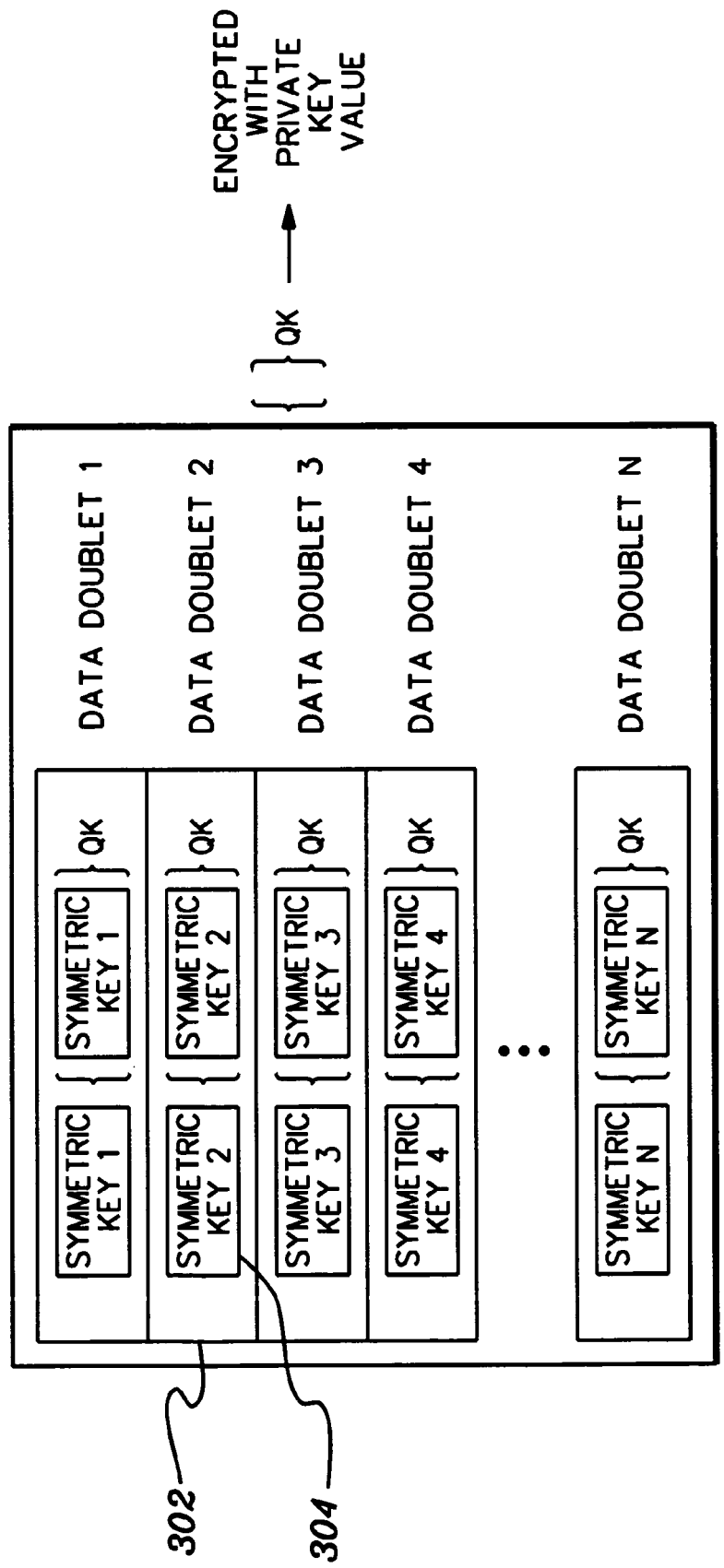
FIG. 3 depicts one example of a cache of pre-generated session keys used in accordance with an aspect of the present invention.

In one example, a session key cache 300 (FIG. 3) includes a plurality of data doublets 302. Each doublet 302 includes a symmetric key value in clear unencrypted form 304 and the same symmetric key value in encrypted form 306. The encrypted form of the symmetric key is created by encrypting the session key value with the private key used by the session key cache application. This session key cache includes a plurality of session keys that are pre-generated, generic, and ready for use when needed.

Figure 4:
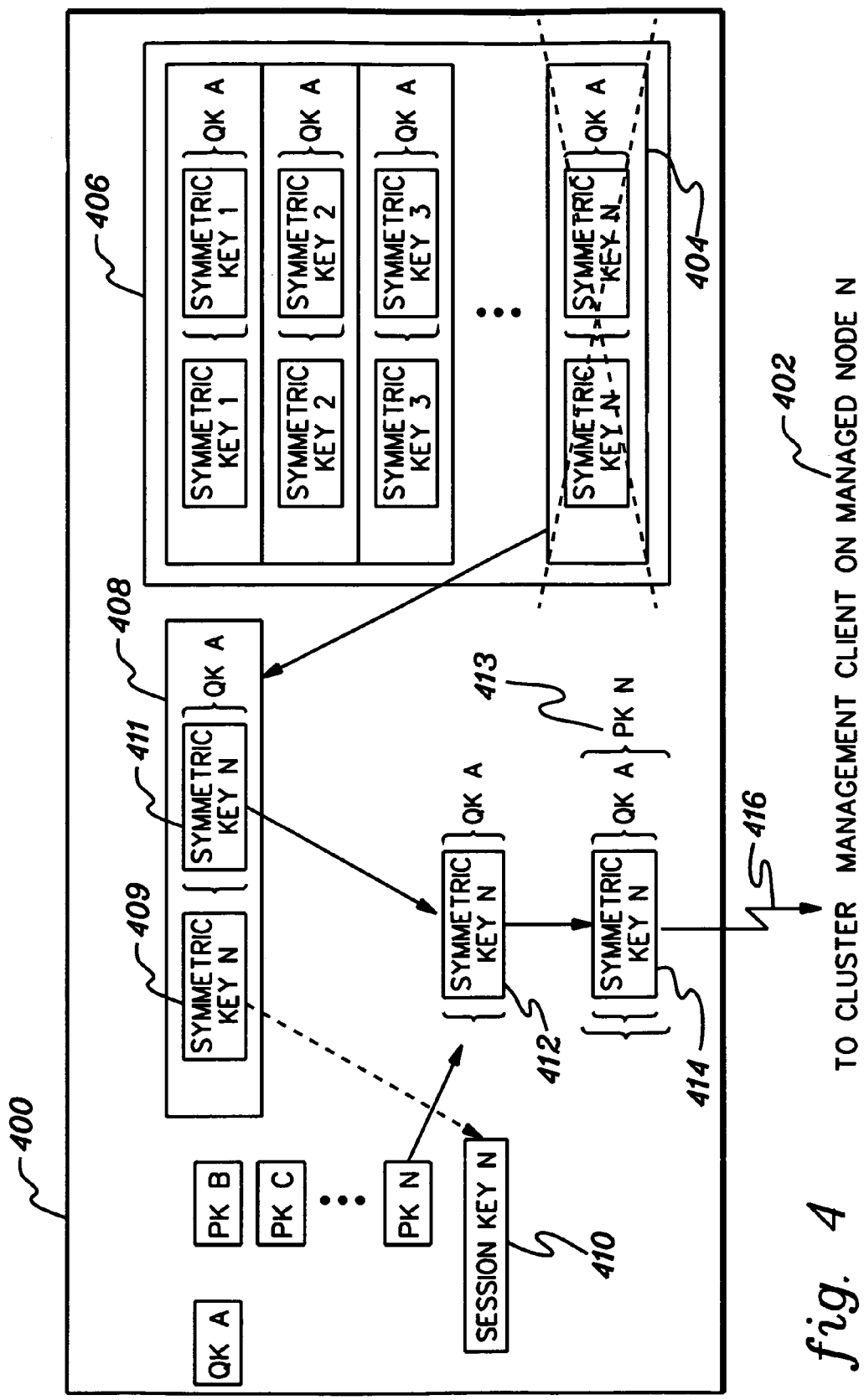
FIG. 4 pictorially depicts one example of selecting and transferring a session key, in accordance with an aspect of the present invention.

As one example, when cluster management application 400 (FIG. 4) establishes a connection to a cluster management client 402 on a managed node, it extracts any available data doublet 404 from an in-memory session key cache 406. The data doublet is brought into immediate process memory 408 and permanently removed from in-memory session key cache 406.

From the data doublet, a clear symmetric key value 409 is extracted and stored in the application's memory as a session key 410 for the connection between the cluster management application and the cluster management client. Further, an encrypted symmetric key value 411 is extracted 412 from the data doublet and further encrypted using the public key 413 used for the managed node, ensuring that only the intended recipient can decipher its value. The resulting encrypted data 414 is transmitted to the cluster management client on the managed node through a network connection 416.

The cluster management client deciphers encrypted data 414 using its own private key. The result is further deciphered using the public key of the cluster management server node. The final result is used as the session key for all communications between this cluster management client and this cluster management application.

Further details associated with establishing a connection between one entity and another entity are described with reference to FIG. 5. In this example, the one entity is a management application and the other entity is a management client that use session keys to communicate. However, in other examples, the communicating entities may be other types of entities.

In the embodiment described herein, a shared multi-threaded library is used to implement and maintain the session key cache used by the communicating entities. The library uses multiple threads (described herein) to create and maintain the session key cache in memory, and optionally, on disk or other storage media. Process multithreading is used to create and maintain the session keys within the process itself. However, this is performed in the background with little explicit action by the exploiting application.

Figure 5:
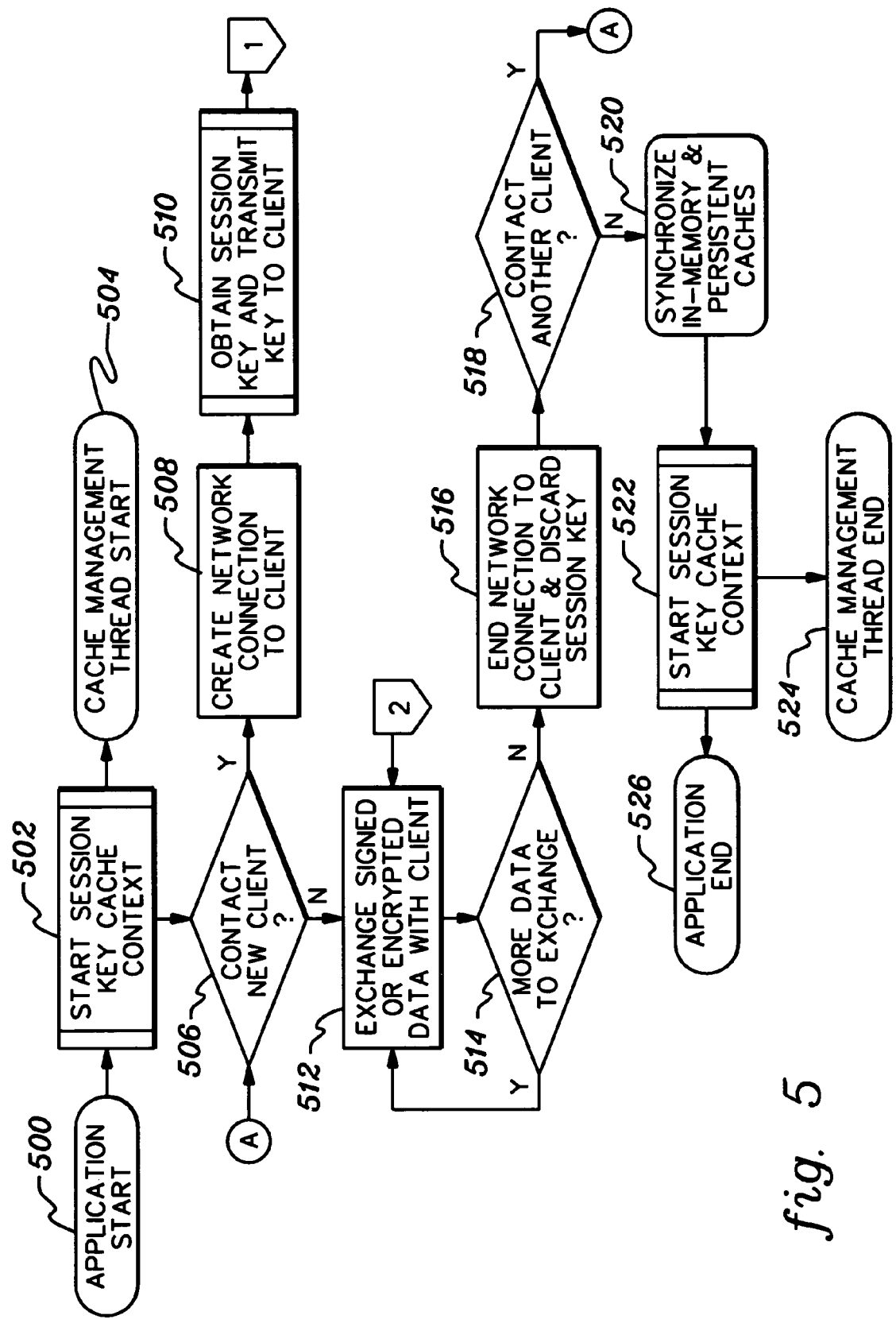
FIG. 5 depicts one embodiment of the logic associated with establishing a connection between two entities, in accordance with an aspect of the present invention.

Referring to FIG. 5, initially, an application is started, STEP 500, and the application establishes a session key cache context 502. In this context, the application specifies certain parameters, such as, for instance, any persistent session key cache to use, the symmetric key technique to use (e.g., DES, AES), the limits of the cache, and whether the in-memory session key cache should be periodically synchronized to persistent storage. For each session key cache used by the application, a session key cache context descriptor is allocated by the library. The key cache context descriptor is protected, for instance, by a pthred mutex lock that serializes access to the context descriptor data. Two pthread conditions are also defined in the context descriptor in order to allow synchronization between the key readers (application threads), a master generator thread and a common generator thread, as described below.

In response to starting the key cache context, a new execution thread, referred to as a master generator thread, is started to perform session key management tasks, STEP 504. The master generator thread, which is created by, for instance, the library, is responsible for the management of the in-memory and possible on-disk versions of the cache. This thread creates any common generator threads needed to replace keys used from the cache and may periodically synchronize the in-memory and on-disk versions of the cache if an on-disk version is used, as described below.

Returning to STEP 502, when an application attempts to contact a client, the application determines if a new connection is required, INQUIRY 506. If it is required, then a new connection to the client is created, STEP 508. The creation of a new connection between the application and its client is dependent on how the application is programmed. As an example, an application that is to establish a communication channel with its clients creates a TCP or UDP socket and then listens/connects to that socket in order to establish a logical connection between the application's process and the client's process.

Figure 8:
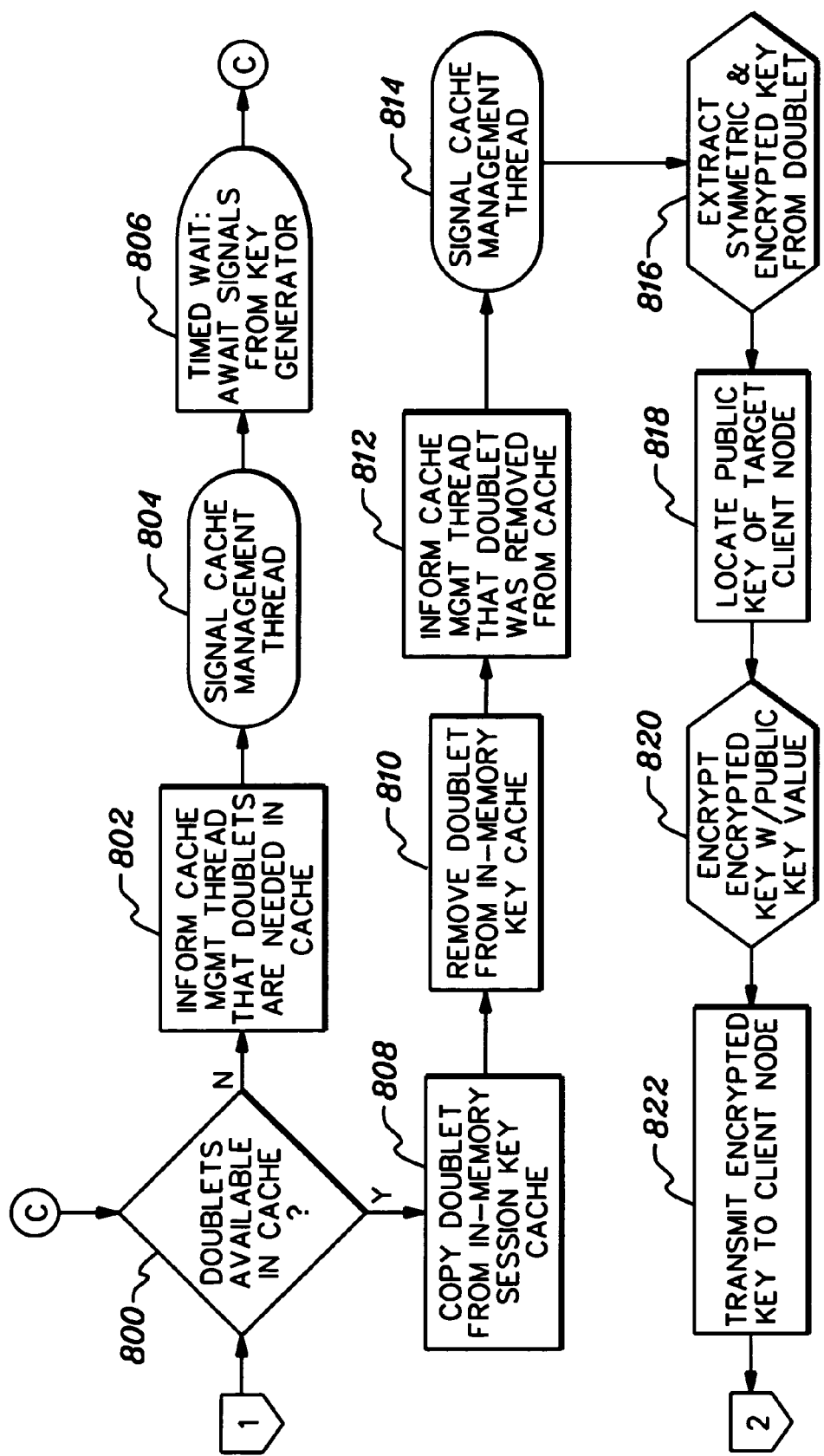
FIG. 8 depicts one embodiment of the logic associated with obtaining session keys, in accordance with an aspect of the present invention.

Prior to exchanging any further information, a session key is obtained from the session cache and transmitted to the client, STEP 510, as described in further detail below with reference to FIG. 8. The application internally associates the new session key value with the connection between the application and the specific client.

Returning to INQUIRY 506, if it is not a new client being contacted, or after the session key is obtained for a new client, the client and application may commence transmitting and receiving information, STEP 512. In particular, signed or encrypted data is exchanged with the client and this continues if there is more data to exchange, INQUIRY 514. When the application and client need no further communications, the application closes the connection to the client and permanently discards its copy of the session key, STEP 516.

Should the application wish to contact another client, INQUIRY 518, processing continues with INQUIRY 506. However, if it is determined that the application is not to contact another client, the application may force a synchronization of the in-memory session cache content and the persistent copy of the session key cache, STEP 520. This may occur at any point during the application's execution. This synchronization ensures that used session keys are removed from the persistent session key cache and not reused in later executions of the application, which protects against data replay attempts.

In one example, an implied synchronizer thread of the application is used to perform the synchronization. The current contents of the in-memory cache are written to disk, overwriting the current on-disk cache contents, if any on-disk contents exist. The application may create threads for this task, or can perform this task in the context of existing application threads. The master generator thread periodically assumes the synchronizer role to flush the current in-memory contents to the on-disk version when demand on the library is low.

Prior to the application ending, the application ends the session key cache context, STEP 522. This action forces the termination of the session key management thread and any other background execution threads started by the management thread, STEP 524, as well as possibly synchronizing the in-memory copy of the session key cache to persistent storage. Thereafter, the application ends, STEP 526.

Figure 6:
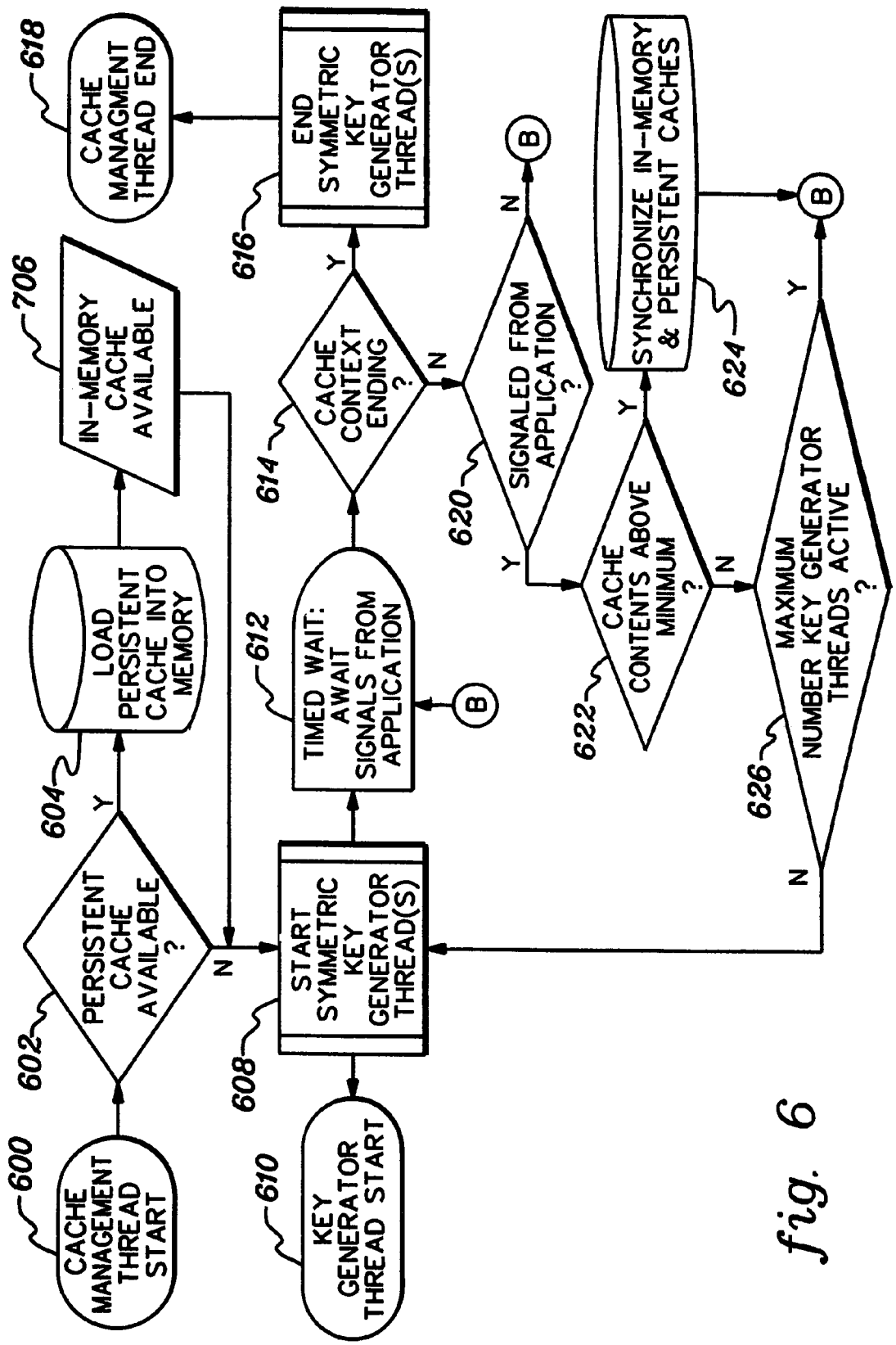
FIG. 6 depicts one embodiment of the logic associated with managing the cache of session keys, in accordance with an aspect of the present invention.

Returning to STEP 504, further details regarding starting the cache management thread is described with reference to FIG. 6. When the session key management thread is started, STEP 600, the thread checks for any persistent session key cache indicated by the application in the session key cache context information, INQUIRY 602. If the persistent cache is located, the contents of the cache are loaded into memory, STEP 604, and the in-memory cache is then available, STEP 606.

The management thread creates one or more background execution threads, STEPs 608, 610 that generate session key doublets to populate the in-memory session key cache and replace any session key doublets that are extracted and removed by the application. These threads are referred to as common generator threads and their creation and destruction are controlled by, for instance, the key cache library. There can be a number of these threads executing in the background concurrently and that number is provided in the key cache context. Each common generator thread is responsible for replacing keys that have been used from the in-memory version of the cache. A generator thread is not started until a certain number of keys, set by the application, are extracted from the cache. The generator thread generates a quota of keys in each pass for performance enhancement.

The management thread pauses and waits for signals from the application, STEP 612. These signals indicate when session keys are extracted and removed from the in-memory session key cache, when the in-memory session key cache is empty, or when the session key cache context is ending.

When the application is resumed, the management thread determines the application status. If the session key cache context is ending, INQUIRY 614, the management thread terminates any background key generator threads that may be active, STEP 616, prior to ending its own execution, STEP 618.

Returning to INQUIRY 614, if the cache context is not ending, then a further determination is made as to whether the management thread was signaled by the application, INQUIRY 620. If the management thread was not signaled by the application, the thread pauses and awaits further activity, STEP 612. However, if the management thread was signaled by the application, then the management thread determines if more session key doublets are desired in the in-memory session key cache, INQUIRY 622. If the cache contents are above a predefined minimum, and thus, sufficiently full (e.g., 75% full or any other desired number), the management thread takes the opportunity to synchronize the in-memory session key contents to persistent storage, STEP 624. The thread pauses again and waits further activity, STEP 612.

If, however, the cache contents appear depleted, the management thread determines if more key generator threads can be created to help replenish the contents of the in-memory session key cache, INQUIRY 626. In particular, a determination is made as to whether the maximum number of key generator threads are active. If the maximum number of key generator threads are active, as indicated in the context, then the thread pauses and waits for further activity, STEP 612. On the other hand, if the maximum number of key generator threads are not active, as indicated in the context, then processing returns to STEP 608, in which a key generator thread is started. When common generator threads add keys to the cache they broadcast a signal such that any blocking readers waiting for keys can wake up and obtain keys. Additionally, when they exit, they provide a signal such that the master generator thread is aware of their termination and, possibly, allow it to create other common generator threads if more keys are desired. This process continues until the application indicates that the session key cache context is ending.

Figure 7:
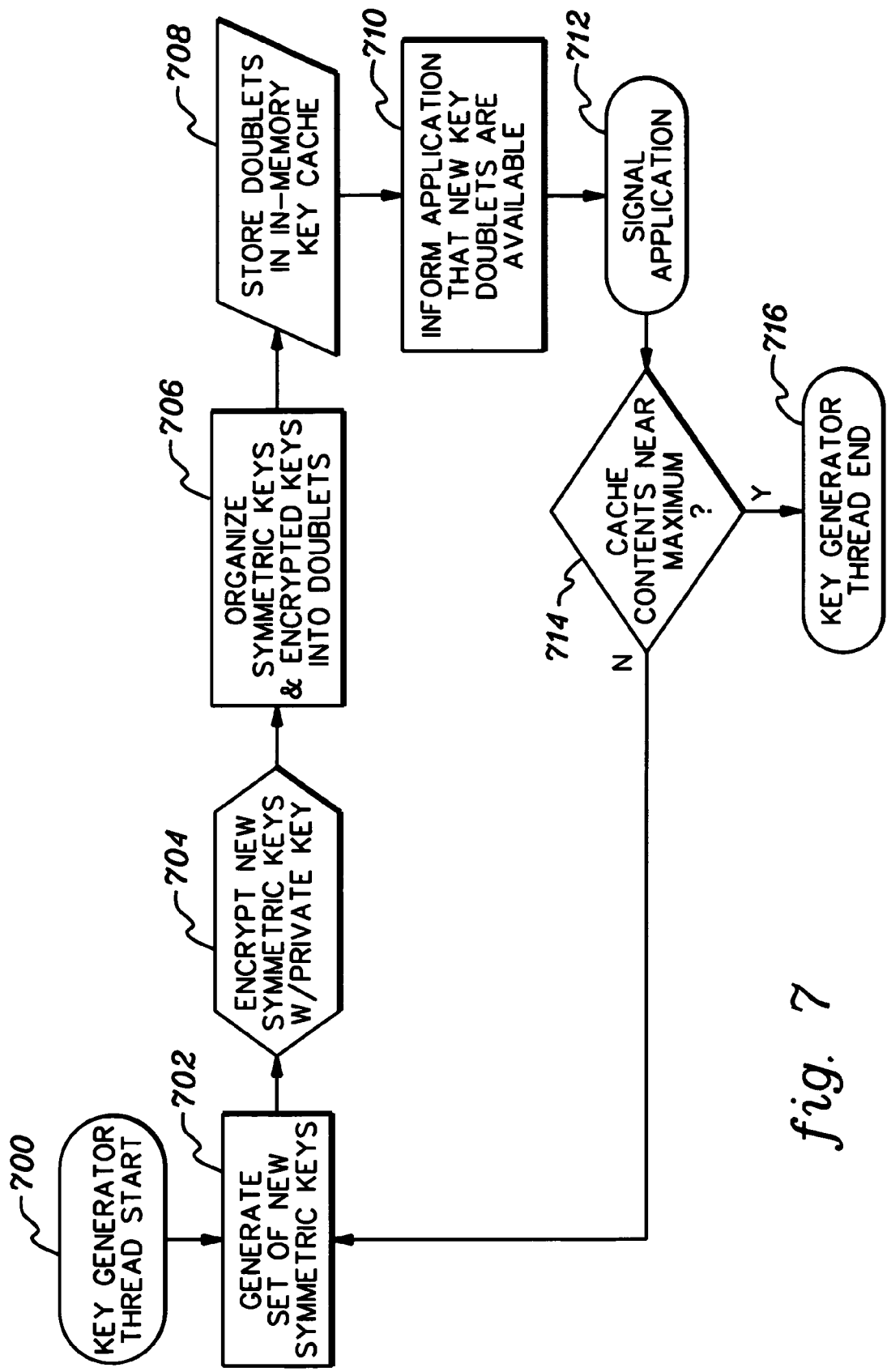
FIG. 7 depicts one embodiment of the logic associated with generating a session key, in accordance with an aspect of the present invention.

Further details regarding the starting of the key generator threads are described with reference to FIG. 7. A key generator execution thread is initiated by the session key cache management thread, STEP 700. The application is unaware that this execution thread has been started. Each key generator thread creates a plurality of symmetric keys in each execution loop for efficiency, STEP 702. The technique used in generating the session keys and the number of keys to create in each loop is specified by, for instance, the application in the session key cache context information. In a further example, a default may be set, which may be overridden by the application.

For each session key generated, the key is encrypted using the private key of the node where the application executes, STEP 704, for data integrity purposes. This session key in its encrypted version is then combined with its in-the-clear version into a data doublet, STEP 706. The data doublets created in this loop are then stored in the in-memory session key cache, STEP 708. Once the session key data doublets are stored in the in-memory session key cache, the key generator execution thread signals the application to inform the application that new keys are available for use, STEPs 710, 712.

The key generator execution thread examines the state of the in-memory session key cache to determine if more session key data doublets are desired, INQUIRY 714. If more session key data doublets are desired, the thread resumes the task of creating further session key data doublets, STEP 702. This process continues until the in-memory session key cache is sufficiently full, as designated by the application. At that point, the key generator execution thread ends, STEP 716.

If the in-memory session key cache becomes depleted at some later point, the session key cache management thread creates new key generator execution threads to replenish the cache.

Returning to FIG. 5, and particularly STEP 510, further details regarding the obtaining and transmitting of session keys are described with reference to FIG. 8. When the application attempts to obtain and transmit a new session key, the application checks for available data doublets within the in-memory session key cache, INQUIRY 800. If no data doublets are available, the application signals a session key management thread to inform it that the session key cache is depleted, STEPs 802, 804. The application then pauses, waiting for notification that new session key data doublets have been made available in the cache, STEP 806. This notification is signaled by the key generator thread, as described with reference to FIG. 7. Once signaled, the processing continues with INQUIRY 800, in which a check is made for an available session key data doublet.

If key doublets are available, any available doublet is removed from the in-memory session key cache and provided to the application, STEP 808. Since the data doublets are not tied to particular destinations, there is no need to search the cache for a particular doublet. Any doublet will suffice. In one example, an implied reader thread of the application performs this action. The application may create threads for this task or can perform this task in the context of existing application threads other than the management thread.

Thereafter, the doublet is permanently removed from the in-memory session key cache, STEP 810, to prevent its reuse from any other connection. The application then signals the session key cache management thread to inform it that a session key data doublet was removed, STEPs 812, 814. This signal may cause the management thread to initiate key generator execution threads to replenish the contents of the in-memory session key cache.

From the data doublet, the application extracts the clear session key and the encrypted form of the session key, STEP 816. The public key for the client node is located by the application, STEP 818, and the encrypted form of the session key is further encrypted using the public key value, STEP 820, for data confidentiality purposes. The result of this encryption is then transmitted to the intended client node, STEP 822. The application and client then use the session key value to sign, verify, encrypt, and/or decipher data transmitted between the application and the client.

Described in detail above is a capability for pre-generating generic session keys, storing those session keys in a pool for access by an application, obtaining a session key when a new connection is made and using the session key to communicate with other entities (e.g., clients, nodes, etc.). For instance, an application that requires symmetric keys enters into a context where a large pool of symmetric keys is made available for the application's use. When symmetric keys are no longer required, the application exits this context, and the pool of symmetric keys is either released or stored for future use, depending upon the request of the application. The only overt actions taken by the mainline application code, in this embodiment, is the creation of the cache context, retrieval of keys, optional synchronization of the in-memory pool of unused symmetric keys to an on-disk persistent storage, and the termination of the cache context. The actual creation, encryption, replenishment and background synchronization of these keys is handled within the application process itself, but in a manner invisible to the mainline application code.

To accomplish these functions invisibly to the mainline application code, but within the application process itself, process multithreading is used. The operating system supports process multithreading and the application is implemented in a thread-safe manner. The data structures provided to encapsulate the cache contexts are protected in a thread-safe manner and support multiple thread access.

When the cache context is entered, the shared library creates and starts a new thread that is responsible for ensuring that the pool of symmetric keys is created and contains a sufficient level of keys. This thread, called a master generator thread, occasionally creates and terminates other threads within the same process that actually create these symmetric keys as need for these keys arise. These threads are known as common generator threads. When the cache context is terminated, the master generator thread and any remaining common generator threads are also terminated.

Advantageously, in accordance with one or more aspects of the present invention, a pool or a cache of symmetric keys is generated that are pre-encrypted for the purpose of data integrity. In one example, these keys are pre-encrypted with the host private key, but are generic in that they can be used with any client to which the host wishes to communicate. Thus, when the management server recovers from a catastrophic failure, it simply extracts keys from a pool that are already encrypted with its private key; therefore, eliminating the most expensive part of the session key distribution. The pool is both an in-memory cache, as well as an on-disk (or other storage medium) cache, in one embodiment.

The caches are stored to disk or other storage media to retain the keys between executions of an application, saving time when the application restarts by permitting it to load a cache of keys, instead of generating a new cache.

In one example, a binary format is used to store the cache to disk. Host byte ordering is also used, in this example. This choice of format makes the cache easier to maintain from the library. Versioning information is stored in the binary file. This will allow the library to detect old or new cache file formats, and extract what information it can use from these files.

As one example, the file format uses self-defining data fields. Each filed includes a field identifier, and a length where the length of the data value might not be apparent from the field identifier. The header information for the file includes a read count. This is a count that is incremented each time the file is read into memory, and reset each time a synchronization of the file is performed (either through the master generator thread processing or explicitly through a routine). This permits the library to detect if the exact same cache has been reused by the application numerous times. A high reuse count might indicate that the application is being terminated before it can update its own cache; it may also indicate that the application is being repeatedly started and stopped in an effort to detect patterns in its data streams and "guess" the key values used to protect the data. If the library detects that the exact same cache file contents have been read too often, the library ignores the cache file and builds a new cache in memory.

As a further enhancement and to provide additional security, the initial reading of the cache file is randomized. Instead of always ordering the in-memory cache in the same order as the keys were read from the cache file, this routine randomly builds the cache in any order. This helps prevent a "guessing" attempt even if the read count check fails.

Examples of the data that is recorded in the on-disk key cache is described below. The file begins with a number that is used to check the type of the file. The next piece of information represents the version of the file. The following pieces of information include: the type of the session key; the number of readings from this file (reset on every write); the number of keys in the cache file; the pre-encryption key challenge (the key count encrypted with the pre-encryption key); the set of key doublets (the same number of keys as the key count):

| | |
|---|---|
| constant: | format version id |
| value: | key type used by the session keys in the cache |
| count: | # of times this file has been read since last modification (reset on write) |
| count: | count of keys in the cache |
| value: | length of pre-encryption key challenge (possibly 0) |
| [data] | pre-encryption key challenge (omitted if length is zero) |
| value: | length of session key (cannot be 0, in this example) |
| [data] | session key |
| value: | length of (possibly) encrypted marshalled key |
| [data] | session key |
| value: | length of (possibly) encrypted marshalled key |
| . | |
| . | |
| . | |
| [etc] | |
| . | |
| . | |
| . | |
| [end of file] | |

When a synchronization occurs, the entire contents of the file are replaced with the contents of the memory key cache context. In other words, it is an overlay. The library does not attempt to search the cache file to detect which keys have been used and which ones are still unused, in this embodiment. This approach provides greater performance during synchronization.

Described in detail above is a capability for efficiently providing session keys to be used in communicating within communications environments. Although examples various embodiments are described above, these are only examples. Many variations to these examples may be included in one or more aspects of the present invention. For example, the environment described herein is only one example. Other types of nodes, servers or clients may benefit from one or more aspects of the present invention. Additionally, more, less or different entities may be included in the environments and communicate with one another. As yet a further example, different types of keys, including different types of session keys, may be used in accordance with one or more aspects of the present invention. Although the structure for the session key pool is a cache structure, this again is only one example. Other structures may be used without departing from the spirit of the present invention. Moreover, although in one implementation, a library and multi-threaded applications are used, again, these are only examples. Other types of applications, including non-library applications may also be used. Yet further, although examples of key generation and encryption are provided, any technique may be used to generate and/or encrypt the keys or other data. Encryption, as used herein, is intended to include any techniques used to protect data. Further, although keys are used herein, one or more aspects of the present invention are applicable to other types of data. Many other variations also exist.

Advantageously, by using this capability, when a management server or other entity recovers from a catastrophic failure, it simply extracts keys from the pool that are already encrypted with the server's (or other entity's) private key, thereby eliminating the most expensive part of the session key distribution. The key that is extracted is generic in that it is not tied to one particular client or destination entity, and therefore, a search of the pool is not necessary. However, in order to provide further security, the key, once extracted, is then encrypted with the intended entity's public key before transmission to the entity.

Advantageously, one or more aspects of the present invention enable a large number of session keys to be pre-generated and maintained in a pool of keys for later use. The keys in the pool are generic, but once selected and processed, provide a unique encryption key between pairings of entities. Thus, each pair of entities to communicate has its own unique key. By pre-generating and signing the session keys in the pool, overhead is reduced, minimizing performance problems and ensuring security and integrity once the keys are used. This capability is beneficial for all types of systems, including, for instance, clustered and distributed systems that have a single point of administrative control. Advantageously, the pool of keys is available on demand and is persistent across restarts of the central points of control. Again, this enhances performance and reduces complexity.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of providing session keys for use in communicating within communications environments, said method comprising:
   using a communications server, encrypting a plurality of session keys using a private key of the communications server to provide a plurality of pre-encrypted session keys for use in communicating between the communications server and one or more second entities of the communications environment, said plurality of pre-encrypted session keys being generic session keys that are created independently of and with no input from the one or more second entities, wherein said plurality of pre-encrypted session keys are further adapted for use by a management application which manages the one or more second entities;
   using the communications server, maintaining the plurality of pre-encrypted session keys in a pool of session keys available for use on a persistent storage device, wherein the pool of session keys comprises a plurality of session key doublets, wherein a session key doublet of the plurality of session key doublets comprises a pre-encrypted session key of the plurality of pre-encrypted session keys and an unencrypted form of the pre-encrypted session key;
   after said encrypting and said maintaining, executing the management application on the communications server; and
   using the communications server, transmitting a pre-encrypted session key of the plurality of pre-encrypted session keys to a second entity of the one or more second entities in response to an attempt by the management application to connect to the one or more second entities, wherein the transmitting comprises extracting the pre-encrypted session key to be transmitted from the pool of session keys, said extracting arbitrarily selecting the pre-encrypted session key, wherein the pre-encrypted session key being extracted is not tied to the second entity, and further encrypting the pre-encrypted session key with a public key of the second entity prior to transmitting the pre-encrypted session key.

2. The method of claim 1, wherein the plurality of session keys include a plurality of symmetric session keys.

3. The method of claim 1, wherein the extracting comprises deleting the extracted pre-encrypted session key from the pool of session keys.

4. The method of claim 1, further comprising managing the pool of session keys, wherein the managing comprises adding one or more pre-encrypted session keys to the pool of session keys, in response to a defined condition.

5. The method of claim 4, wherein the managing comprises automatically adding the one or more pre-encrypted session keys, in response to detection of an insufficient number of pre-encrypted session keys in the pool of session keys.

6. The method of claim 1, wherein the pool of session keys is stored in-memory, and wherein the method further comprises providing a persistent storage of the in-memory pool of session keys.

7. The method of claim 1, wherein the communications environment comprises a clustered environment, the communications server comprises a server of the clustered environment, the management application is a cluster management application and the one or more second entities comprise one or more clients of the clustered environment coupled to the communications server.

8. A method of providing session keys for use in communicating within a communications environment, said method comprising:
   using a communications server, creating a pool of session key doublets for use in communicating between the communications server and a second entity of the communications environment, said pool of session key doublets providing a plurality of session key doublets, wherein a session key doublet comprises a session key pre-encrypted with a private key of the communications server but generic to the second entity and the same session key in an unencrypted form, and the session key doublets are adapted for use by a management application which manages the second entity;

storing the pool of session key doublets on a persistent storage device of the communications server;

after said creating and said storing, executing the management application on the communications server;

using the communications server, arbitrarily selecting one of the session key doublets from the pool of session key doublets in response to an attempt by the management application to connect to the second entity;

using the communications server, extracting from the arbitrarily selected session key doublet the pre-encrypted session key;

using the communications server, encrypting the pre-encrypted session key with a public key of the second entity to provide a further encrypted session key; and using the communications server, transmitting the further encrypted session key to the second entity for use in communications with the first entity.

9. The method of claim 8, wherein the communications server uses the unencrypted form of the session key in communicating with the second entity.

10. A system of providing session keys for use in communicating within communications environments, said system comprising:

a persistent storage device having a plurality of session keys encrypted using a private key of a communications server of the communications environment to provide a plurality of pre-encrypted session keys for use in communicating between the communications server and one or more second entities of the communications environment, said plurality of pre-encrypted session keys being generic session keys that are created independently of and with no input from the one or more second entities, wherein said plurality of pre-encrypted session keys are further adapted for use by a management application which manages the one or more second entities;

a session key pool to maintain the plurality of pre-encrypted session keys, wherein the session key pool comprises a plurality of session key doublets, wherein a session key doublet of the plurality of session key doublets comprises a pre-encrypted session key of the plurality of pre-encrypted session keys and an unencrypted form of the pre-encrypted session key; and a transmitting component to transmit a pre-encrypted session key of the plurality of pre-encrypted session keys to a second entity of the one or more second entities in response to an attempt by the management application to connect to the one or more second entities and to extract the pre-encrypted session key to be transmitted from the pool of session keys, the extracting arbitrarily selecting the pre-encrypted session key, wherein the pre-encrypted session key being extracted is not tied to the second entity, said pre-encrypted session key further encrypted using a public key of the second entity prior to transmitting the pre-encrypted session key.

11. The system of claim 10, further comprising a manager to manage the pool of session keys, wherein the managing comprises adding one or more pre-encrypted session keys to the pool of session keys, in response to a defined condition.

12. A system of providing session keys for use in communicating within a communications environment, said system comprising:

means for arbitrarily selecting a session key doublet from a pool of session key doublets for use in communicating between a communications server of the communications environment and a second entity of the communications environment, said pool of session key doublets providing a plurality of session key doublets, wherein a session key doublet comprises a session key pre-encrypted with a private key of the communications server but generic to the second entity; and the same session key in an unencrypted form, the session key doublets are adapted for use by a management application which manages the second entity, the pool of session key doublets is created prior to execution of the management application and stored in a persistent storage device of the communications server, and the selecting means is responsive to an attempt by the management application to connect to the second entity;

means for extracting from the arbitrarily selected session key doublet the pre-encrypted session key;

means for encrypting the pre-encrypted session key with a public key of the second entity to provide a further encrypted session key; and means for transmitting the further encrypted session key to the second entity for use in communications with the communications server in response to an attempt by the management application to connect to the second entity.

13. The system of claim 12, wherein the communications server uses the unencrypted form of the session key in communicating with the second entity.

14. An article of manufacture comprising:

at least one computer usable storage medium having computer readable instructions to provide session keys for use in communicating within communications environments, the computer readable instructions comprising:

instructions to encrypt a plurality of session keys using a private key of a communications server of the communications environment to provide a plurality of pre-encrypted session keys for use in communicating between the communications server and one or more second entities of the communications environment, said plurality of pre-encrypted session keys being generic session keys that are created independently of and with no input from the one or more second entities, wherein said plurality of pre-encrypted session keys are further adapted for use by a management application which manages the one or more second entities;

instructions to store the plurality of pre-encrypted session keys in a persistent storage device of the communications server;

instructions to begin execution of the management application on the communications server after the plurality of session keys have been encrypted;

instructions to maintain the plurality of pre-encrypted session keys in a pool of session keys available for use, in response to an attempt by the management application to connect to the one or more second entities, wherein the pool of session keys comprises a plurality of session key doublets, wherein a session key doublet of the plurality of session key doublets comprises a pre-encrypted session key of the plurality of pre-encrypted session keys and an unencrypted form of the pre-encrypted session key; and instructions to further encrypt a pre-encrypted session key of the plurality of pre-encrypted session keys with a public key of a second entity of the one or more second entities and transmit the further encrypted pre-encrypted session key of the plurality of pre-encrypted session keys to the second entity; and instructions to extract the pre-encrypted session key to be transmitted from the pool of session keys by arbitrarily selecting the pre-encrypted session key, wherein the pre-encrypted session key being extracted is not tied to the second entity.

15. The article of manufacture of claim 14, further comprising instructions to add one or more pre-encrypted session keys to the pool of session keys, in response to a defined condition.

16. An article of manufacture comprising:

at least one computer usable storage medium having computer readable instructions to provide session keys for use in communicating within a communications environment, the computer readable instructions comprising:

instructions to arbitrarily select a session key doublet from a pool of session key doublets for use in communicating between a first entity of the communications environment and a second entity of the communications environment, said pool of session key doublets providing a plurality of session key doublets, wherein a session key doublet comprises a session key pre-encrypted with a private key of the first entity but generic to the second entity and the same session key in an unencrypted form, the session key doublets are adapted for use by a management application which manages the second entity, the pool of session key doublets is created and stored in a persistent storage device of the first entity prior to execution of the management application;

instructions to extract from the arbitrarily selected session key doublet the pre-encrypted session key;

instructions to encrypt the pre-encrypted session key with a public key of the second entity to provide a further encrypted session key; and instructions to transmit the further encrypted session key to the second entity for use in communications with the first entity in response to an attempt by the management application to connect to the second entity.

17. The article of manufacture of claim 16, wherein the first entity uses the unencrypted form of the session key in communicating with the second entity.

* * * * *